United States Patent [19]

Nishii

[11] Patent Number: 4,803,912
[45] Date of Patent: Feb. 14, 1989

[54] BRAKE BOOSTER WITH SLEEVE AND DETENT RETAINED PRESSURE PLATE

[75] Inventor: Michiharu Nishii, Toyota, Japan

[73] Assignee: Aisin Seiki Kabushiki Kaisha, Kariya, Japan

[21] Appl. No.: 105,979

[22] Filed: Oct. 6, 1987

Related U.S. Application Data

[63] Continuation of Ser. No. 825,999, Feb. 4, 1986, abandoned.

[30] Foreign Application Priority Data

Feb. 4, 1985 [JP] Japan .............................. 60-14534[U]

[51] Int. Cl.$^4$ .............................................. F15B 9/10
[52] U.S. Cl. .................................. 91/369.2; 92/98 D; 92/99
[58] Field of Search ................ 92/96, 98 R, 98 D, 99; 91/369 A, 369 C, 369 R, 376 R; 403/365

[56] References Cited

U.S. PATENT DOCUMENTS

| | | | |
|---|---|---|---|
| 1,611,176 | 12/1926 | Fekete | 403/365 X |
| 2,160,248 | 5/1939 | Colman | 92/99 X |
| 3,136,229 | 6/1964 | Bauman | 92/98 D |
| 3,249,021 | 5/1966 | Wuellner | 92/99 X |
| 3,656,413 | 4/1972 | Eggstein | 92/99 X |
| 3,880,049 | 4/1975 | Grabb et al. | 91/376 R X |
| 3,897,718 | 8/1975 | Gardner et al. | 92/99 X |
| 4,066,005 | 1/1978 | Farr | 92/99 X |
| 4,345,506 | 8/1982 | Ohomi | 92/99 X |
| 4,348,944 | 9/1982 | Ochiai | 92/99 X |
| 4,519,295 | 5/1985 | Fulmer | 91/376 R |
| 4,587,889 | 5/1986 | Ohki et al. | 92/98 D |
| 4,598,624 | 7/1986 | Wagner | 91/376 R |

FOREIGN PATENT DOCUMENTS

| | | | |
|---|---|---|---|
| 2326415 | 12/1973 | Fed. Rep. of Germany | 92/98 D |
| 3210125 | 10/1982 | Fed. Rep. of Germany | 92/98 D |
| 57-18552 | 1/1982 | Japan | 92/99 |
| 2082275 | 3/1982 | United Kingdom | 92/98 D |

*Primary Examiner*—Robert E. Garrett
*Assistant Examiner*—George Kapsalas
*Attorney, Agent, or Firm*—Oblon, Fisher, Spivak, McClelland & Maier

[57] ABSTRACT

A servomotor device which includes a power piston and a diaphragm having an inner bead and which is disposed within a housing so as to divide the same into a constant pressure chamber and a variable pressure chamber, the power piston including a hub having a first shoulder faced toward the variable chamber and a second shoulder faced toward the constant pressure chamber, a pressure plate which includes the power piston engaged with the hub and having an inner sleeve portion engageable with the first shoulder so as to prevent movement of the pressure plate toward the constant pressure chamber with respect to hub, a detent portion unitarily formed on the pressure plate and engageable with the second shoulder so as to prevent movement of pressure plate toward the variable pressure chamber with respect to the hub, and a groove formed in the hub for hermetically retaining the inner bead of diaphragm therein.

5 Claims, 5 Drawing Sheets in FIG. 7.

BRAKE BOOSTER WITH SLEEVE AND DETENT RETAINED PRESSURE PLATE

This application is a continuation of application Ser. No. 825,999, filed on Feb. 4, 1986, now abandoned.

BACKGROUND OF THE INVENTION

1. Field of the Invention

This invention relates generally to a servomotor device and more specifically to a servomotor device for a brake booster for an automobile. A power piston in the servomotor device, which divides an interior portion of a housing into a constant pressure chamber and a variable pressure chamber with a diaphragm, comprises a hub having a control valve for controlling the pressure difference between the constant pressure chamber and the variable pressure chamber and a pressure plate of metal engaged with the hub and prevented from movement toward the constant pressure chamber with respect to the hub by engagement of an inner sleeve portion thereof with a shoulder located on the hub and facing toward the variable chamber.

2. Description of the Prior Art

A servomotor device is disclosed in U.S. Pat. No. 3,897,718. In such conventional servomotor device, a hub made of plastic resin is combined with a pressure plate made of metal for engaging an inner sleeve portion of pressure plate with a first groove formed on an outer peripheral portion of hub and a shoulder facing toward a variable chamber so as to prevent movement of the pressure plate toward the constant pressure chamber with respect to the hub and a second groove for retaining an inner bead of a diaphragm hermetically formed on inner side of inner sleeve portion so as to prevent movement of the pressure plate toward the variable pressure chamber by the diaphragm. However, the diaphragm can become damaged due to the force of the pressure plate, moving toward the variable pressure chamber with respect to the hub, which operates as a shearing force on the diaphragm. Furthermore, when the damaged diaphragm is removed, the diaphragm is oftentimes cut by a knife so as to separate the diaphragm from the power piston, whereby the connection of the pressure plate with the hub is released. Therefore it is very troublesome to exchange the diaphragm.

SUMMARY OF THE INVENTION

It is an object of the present invention to avoid the aforementioned and other disadvantages of a conventional servomotor device.

More particularly, an object of the present invention is to provide an improved servomotor device which prevents the diaphragm from becoming damaged.

Another object of the present invention is to provide an improved servomotor device which can be installed in a groove formed on a hub independently without releasing the combination of the pressure plate with the hub so as to exchange the diaphragm easily.

These and other objects are accomplished by the present invention of servomotor device comprising a detent portion unitarily formed at an inner sleeve portion of a pressure plate and for engaging with a shoulder formed on a hub, which shoulder faces toward a constant pressure chamber, so as to prevent movement of the pressure plate toward a variable pressure chamber with respect to the hub, and a groove for retaining an inner bead of a diaphragm hermetically by the elasticity of the diaphragm and which is formed on the hub the side toward the variable pressure chamber over an inner peripheral portion of pressure plate. Consequently, in the present invention, damage to the diaphragm does not occur due to the force of the pressure plate moving toward the variable pressure chamber. Furthermore, it is easy to exchange the diaphragm because attachment and detachment of the inner bead of the diaphragm to and from the groove can be accomplished without disconnecting the pressure plate from the hub.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
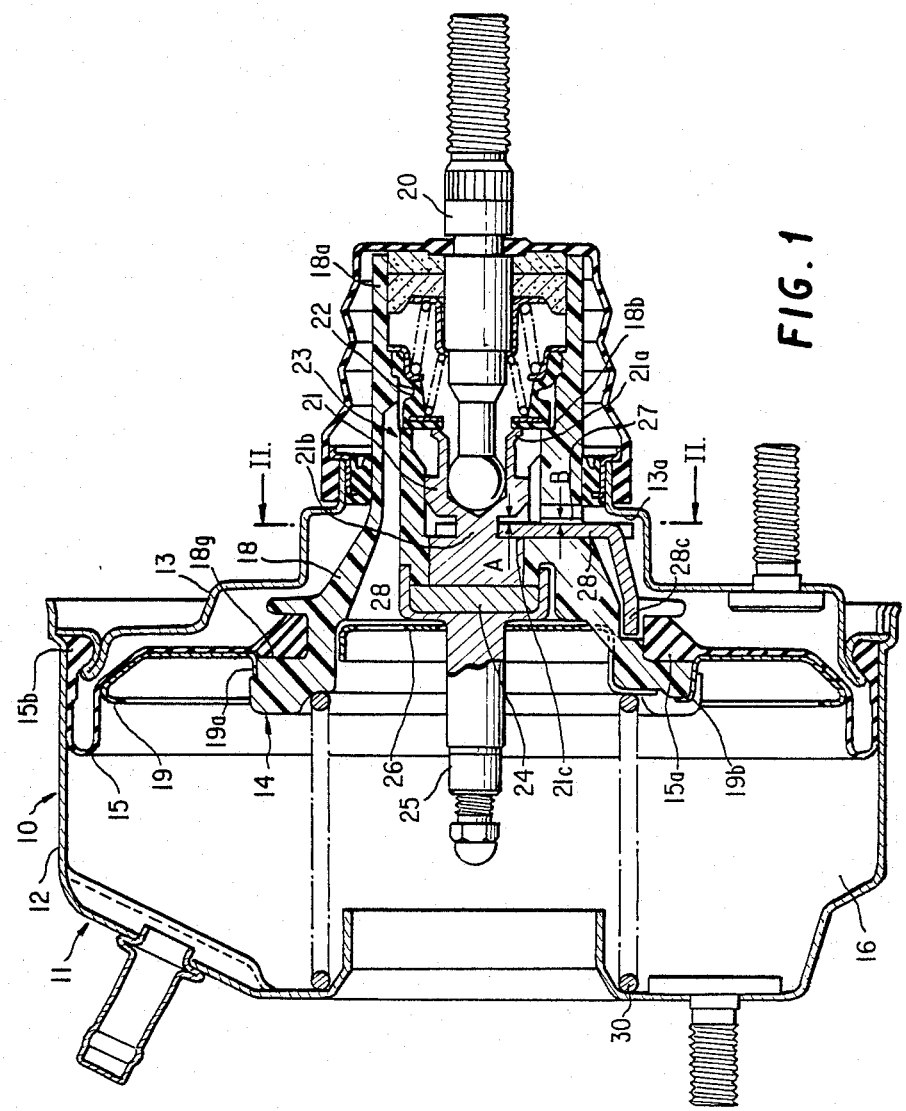
FIG. 1 is a cross-sectional view of a servomotor according to the present invention.
Figure 2:
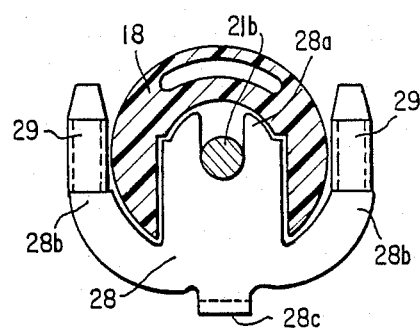
FIG. 2 is a cross-sectional view taken along line II—II of FIG. 1.
Figure 3:
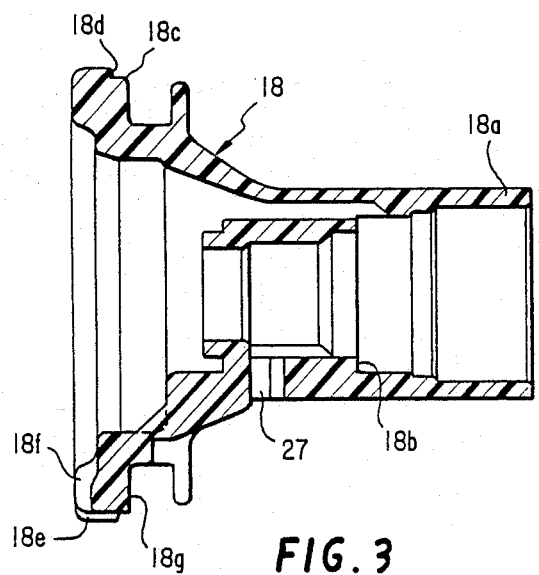
FIG. 3 is an enlarged cross-sectional view of a hub shown in FIG. 1.
Figure 4:
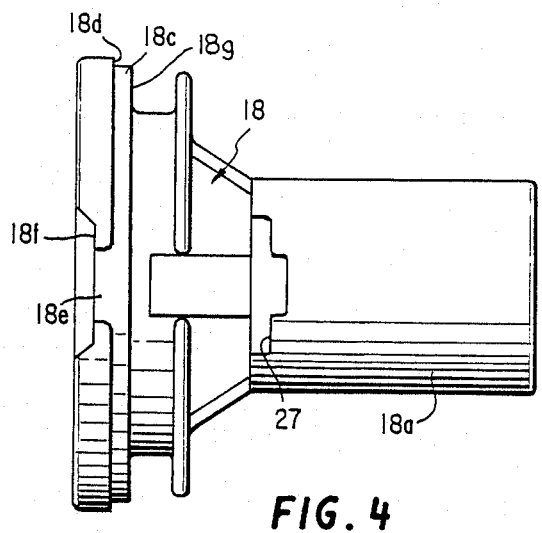
FIG. 4 is a bottom side view of the hub shown in FIG. 3.

FIG. 1 shows an embodiment of the invention wherein a housing 11 of a servomotor device 10 comprises a first housing member 12 and a second housing member 13 fixed to each other. An interior portion of housing 11 is divided into a constant pressure chamber 16 and a variable pressure chamber 17 by a diaphragm 15 made of rubber. An inner bead 15a of diaphragm 15 is retained on a power piston 14, and an outer bead 15b thereof is mounted on housing 11.

The power piston 14 comprises a hub 18 of plastic resin having a slidable, hermetically sealed cylindrical portion 18a which penetrates the second housing member 13 and a pressure plate 19 made of steel which engages with hub 18.

A well known control valve 23 for controlling the difference in pressure between constant pressure chamber 16 and variable pressure chamber 17 is installed within hub 18. The control valve 23 comprises a plunger 21 connected with an input rod 20 connected with a brake pedal (not shown), a valve seat 21a formed on a right end portion of plunger 21 in FIG. 1, a valve seat 18b is formed on hub 18, and a poppet valve 22 is provided which faces toward valve seats 21a and 18b.

In operation of control valve 23, when an operational force is not applied leftwardly to the input rod 20, the variable pressure chamber 17 is communicated with the constant pressure chamber 16, whereby the pressure difference between constant pressure chamber 16 and variable pressure chamber 17 disappears whereupon the power piston 14 is returned to the position shown in FIG. 1 by action of a biasing spring 30.

Furthermore, when the input rod 20 is operated leftwardly, the variable pressure chamber 17 is communicated with atmospheric pressure whereby a pressure difference between constant pressure chamber 16 and variable pressure chamber 17 exists. The power piston 14 is then moved leftwardly due to the pressure difference.

An output rod 25 for transmitting the operational force of power piston 14 to a piston (not shown) of a brake master cylinder (not shown) and for applying a reaction force to the plunger 21 and installing a reaction disk 24 therein is mounted on the hub 18 and is prevented from slipping off by a retainer 26.

The length of stroke of plunger 21 against hub 18 is determined by a key 28 made of metal installed in a radial hole 27 of hub 18 and securing a small diameter portion 21b of plunger 21 by means of a pair of end portions 28a of key 28. The thickness of key 28 is less than the length of small diameter portion 21b and therefore the plunger 21 and the key 28 are movable leftwardly and rightwardly, respectively, by the differential distance A between the length of small diameter portion 21b and the thickness of key 28, as shown in FIG. 1. The axial length of hole 27 is greater than the thickness of key 28 and therefore the hub 18 and key 28 are movable leftwardly and rightwardly with respect to each other by the differential distance B between the axial length of hole 27 and the thickness of key 28.

A pair of arm portions 28b extending along an outer circumferential portion of hub 18 are formed on the key 28. Each arm portion 28b is engageable with a shoulder portion 13a of second housing member 13 passing through a rubber cushion member 29 mounted thereon. A bent portion 28c formed on key 28 prevents the key 28 from slipping off from hub 18 due to engagement of the bent portion 28c with the inner bead 15a of diaphragm 15. Therefore, spring 30 biases power piston 14 rightwardly in FIG. 1 and the power piston 14 is returned to the position where the pair of arm portions 28b of key 28 are engaged with the shoulder 13a of second housing member 13 via cushion member 29 and a left end surface of hole 27 in hub 18 is engaged with key 28.

FIG. 1 shows the position wherein the power piston 14 is properly returned. In the condition shown in FIG. 1, the poppet valve 22 engages with the valve seat 21a of plunger 21 and is disengaged from the valve seat 18b by a very short distance.

When the power piston 14 is moved leftwardly from the position thereof shown in FIG. 1, which is the operational condition of servomotor device 10, the engaging relation between the pair of arm members 28b of key 28 and the shoulder 13a of second housing member 13 no longer occurs due to the discontinuance of depression of the brake pedal. The power piston 14 is returned to the position where the plunger 21 moves rightwardly with respect to hub 18. Therefore a shoulder 21c formed at left end of small diameter portion 21b of plunger 21 is engaged with key 28 and the key 28 is engaged with a right end surface of hole 27 of hub 18. Consequently, the poppet valve 22 which is already disengaged from the valve seat 18b by a small distance (see FIG. 1) is further separated from valve seat 18b by the value of distance B.

Moreover, when the brake pedal is depressed, the plunger 21 moves leftwardly a maximum limit corresponding to distance A with respect to hub 18 in FIG. 1. The poppet valve 22 thus engages the valve seat 18b and disengages from the valve seat 21a.

Figure 5:
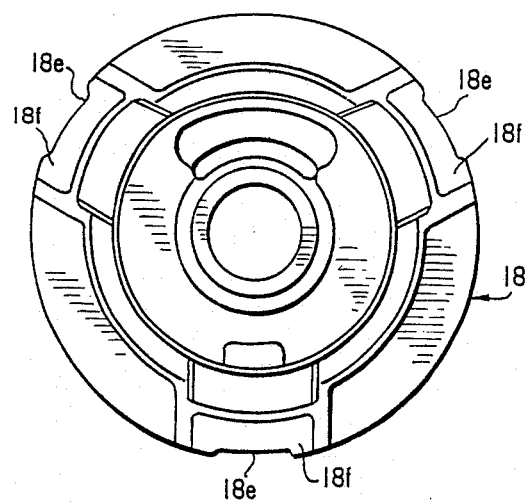
FIG. 5 is a left side view of the hub shown in FIG. 4.
Figure 6:
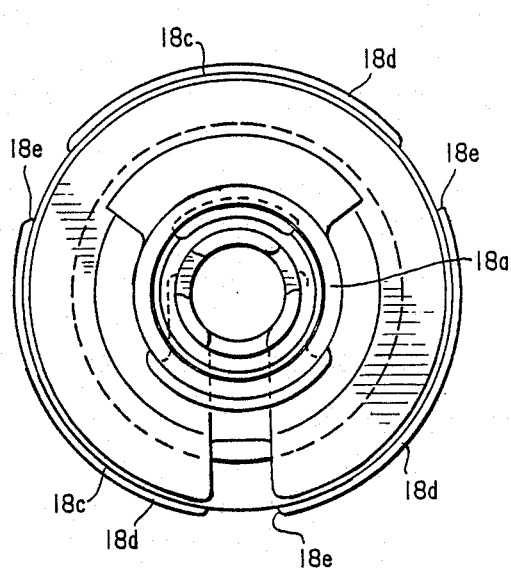
FIG. 6 is a right side view of the hub shown in FIG. 4.
Figure 7:
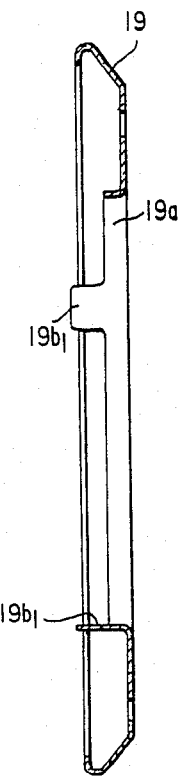
FIG. 7 is a cross-sectional view of a pressure plate of the present invention when disassembled.
Figure 8:
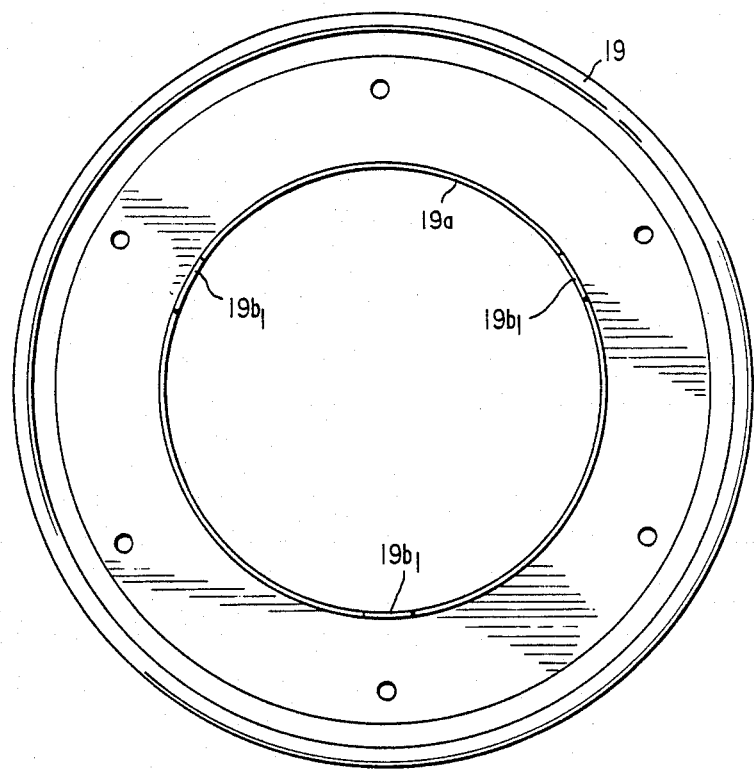
FIG. 8 is a left side view of the pressure plate shown in FIG. 7.

The combined structure of hub 18 and pressure plate 19 in power piston 14 is shown in FIG. 1 and FIGS. 3–8. As shown in FIGS. 1, 7 and 8, an inner sleeve portion 19a formed on an inner peripheral portion of pressure plate 19 is installed in a groove 18c formed on an outer peripheral portion of hub 18. Movement of pressure plate 19 toward the constant pressure chamber 16 (i.e. leftward in FIG. 1) is prevented by engagement between the tip of inner sleeve portion 19a of pressure plate 19 and a shoulder 18d formed on hub 18. A detent portion 19b installed in a groove 18e formed on an outer peripheral portion of hub 18 and which engages with a shoulder 18f formed on hub 18 and faces toward the constant chamber 16 is unitarily formed at inner sleeve portion 19a of pressure plate 19.

By engagement of the detent portion 19b of pressure plate 19 with the shoulder 18f of hub 18, movement of pressure plate 18 toward the variable pressure chamber 17 (rightwardly in FIG. 1) is prevented. By the engagement of detent portion 19b of pressure plate 19 with the groove 18e, rotation of pressure plate 19 with respect to hub 18 is prevented. The hub 18 has three grooves 18e and shoulders 18f, respectively, as shown in FIGS. 5 and 6, and the pressure plate 19 also has three detent portions 19b corresponding to the grooves 18e and shoulders 18f.

The detent portions 19b of pressure plate 19 extend along with inner sleeve portion 19a thereof as designated by reference numerals 19b in FIGS. 7 and 8 before the pressure plate 19 engages with hub 18. After the pressure plate 19 engages with hub 18, the detent portions 19b of pressure plate 19 are bent so as to be hook-shaped as shown in FIG. 1 so as to fix pressure plate 19 in position and thus not damage diaphragm 15 is operation.

A groove 18g is formed on hub 18 and hermetically retains therein the inner bead 15a of diaphragm 15 due to the elasticity of diaphragm 15 along the groove 18g. Groove 18g is positioned on a variable pressure chamber 17 side of pressure plate 19. Therefore, the inner bead 15a of diaphragm 15 can be attached to and detached from the groove 18g independently of the connection of pressure plate 19 with hub 18 and so as to therefore differ from prior art devices such as U.S. Pat. No. 3,897,718.

In the above mentioned embodiment, the detent portion 19b of pressure plate 19 is formed to be hook-shaped by being bent after the pressure plate 19 is engaged with hub 18. However, if the detent portion 19b is formed to be the hook-shaped under the single part condition thereof, the hooked detent portion 19b can not only retain to the hub 18 but can also be detached from hub 18 by rotation of pressure plate 19 with respect to hub 18. Although not shown, if the hub 18 is modified so as to be provided with a corresponding groove for introduction of the hooked detent portion 19b, then the corresponding groove can be continuously formed with groove 18e.

The present invention is also applicable to a servomotor device which generates a pressure differential between the constant pressure chamber and variable pressure chamber by using a positive pressure and atmospheric pressure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A servomotor device, comprising:
   a housing;
   a power piston disposed within said housing;
   a diaphragm member having an inner bead and which is disposed within said housing and engaged with said power piston for dividing said housing into a constant pressure chamber and a variable pressure chamber wherein said power piston further comprises hub means having an outer peripheral portion having a groove formed therein, a first shoulder and at least one second shoulder wherein said first shoulder faces towards said variable pressure chamber and said at least one second shoulder faces toward said constant pressure chamber;
   a pressure plate having an inner sleeve portion positioned in said groove formed on said outer peripheral portion of said hub means, said inner sleeve portion engaging with said first shoulder of said hub means so as to prevent movement of said pressure plate toward said constant pressure chamber; and
   a control valve for controlling a differential pressure between said constant pressure chamber and said variable pressure chamber, said pressure plate including at least one detent portion unitarily formed thereon and engageable with said second shoulder of said hub means so as to prevent movement of said pressure plate toward said variable pressure chamber, said hub means including a first groove formed on a variable pressure chamber side of said pressure plate for hermetically retaining said inner bead of said diaphragm member; such that said inner bead is attachable to and detachable from said first groove without release of connection between said pressure plate and said hub means.

2. A servomotor device as recited in claim 1 wherein said hub mean includes at least one second groove for engaging said detent portion of said pressure plate means so as to prevent rotation of said pressure plate with respect to said hub means.

3. A servomotor device as recited in claim 2 wherein said at least one second shoulder further comprises three second shoulders said at least one second groove further comprises three second grooves.

4. A servomotor device as recited in claim 1 wherein said at least one detent portion further comprises three detent portions.

5. A servomotor device as recited in claim 1, said hub means including at least one second groove for engaging said detent portion of said pressure plate means so as to prevent rotation of said pressure plate with respect to said hub means wherein;
   an end portion of said constant pressure chamber side of the inner sleeve portion engages with the first shoulder of the hub means;
   said detent portion is integrally formed on an end portion of the constant pressure chamber side of the inner sleeve portion; and
   said inner bead is attachable to and detachable from said first groove without movement of said pressure plate relative to said hub means.

* * * * *